United States Patent [19]
Longworth

[11] 3,877,478
[45] Apr. 15, 1975

[54] FLUID FLOW CONTROL VALVES

[75] Inventor: Alfred Longworth, Wembley, England

[73] Assignee: Radiation Limited, London, England

[22] Filed: Sept. 5, 1973

[21] Appl. No.: 394,417

[30] Foreign Application Priority Data
Sept. 11, 1972 United Kingdom............ 42103/72

[52] U.S. Cl. .................. 137/94; 137/87; 251/65
[51] Int. Cl. ............................................. F16k 31/08
[58] Field of Search............ 137/87, 94; 122/448 R, 122/448 S; 126/351; 236/25 A; 251/65

[56] References Cited
UNITED STATES PATENTS

| | | | |
|---|---|---|---|
| 2,310,562 | 2/1943 | Whittington | 251/65 |
| 2,842,150 | 7/1958 | Olson | 251/65 X |

FOREIGN PATENTS OR APPLICATIONS

| | | | |
|---|---|---|---|
| 1,045,625 | 12/1958 | Germany | 137/94 |
| 732,670 | 6/1932 | France | 137/94 |

Primary Examiner—Robert G. Nilson
Attorney, Agent, or Firm—Brisebois & Kruger

[57] ABSTRACT

A first magnetic valve in one housing controls the flow of fluid through that housing in dependence upon the position of a second magnetic valve in a second housing. The position of the second magnetic valve is controlled by fluid flow through the second housing.

14 Claims, 3 Drawing Figures

FLUID FLOW CONTROL VALVES

This invention relates to fluid flow control valves and has particular reference to valves for controlling the flow of one fluid in response to the flow of another fluid.

Valves of the kind just mentioned have many applications and are used, for example, in gas-fired water heaters. In such cases, gas flow is controlled in accordance with water flow, a gas flow control valve being mechanically linked to a device responsive to water flow. The use of a mechanical linkage is not completely satisfactory and it has been proposed to replace the mechanical linkage by a magnetic linkage. However, previous proposals have not fully exploited the advantages of magnetic linkage and it is an object of the present invention to provide an improved valve embodying magnetic linkage.

According to the present invention apparatus for controlling the flow of one fluid in dependence upon the flow of another fluid comprises a first housing having a flow path therethrough for one fluid, a second housing having a flow path therethrough for the other fluid, the flow paths being in non-communicating relationship, fluid flow control means in the flow path in the first housing for controlling fluid flow along this path, means in the flow path in the second housing movable in response to a predetermined fluid flow along this path, first and second permanent magnets associated and movable with the flow control member and the flow responsive means respectively, the housings being of non-magnetic material and positioned in such manner that, in use, movement of the movable means in response to the predetermined flow results in movement of the flow control means to a position in which flow of the one fluid is permitted.

Where the two fluids are different and have different physical and chemical properties, each housing is preferably of a material selected in accordance with the properties of the respective fluid. For example, in an embodiment suitable for a gas-fired water heater where the one fluid is gas and the other fluid water, the first housing may be of aluminium alloy and the second housing of glass-filled P.P.O..

Preferably, resilient means are provided for biassing the flow control means to a position in which fluid flow along the path in the first housing is prevented.

In one embodiment of the invention, movement of the flow responsive member takes place within a guide located in the flow path in the second housing, the guide acting as a weir in the flow path to ensure a predetermined movement of the flow responsive member. Preferably, the guide is removably mounted in the flow path.

Associated with the flow control means may be a device exposed, in use, to fluid pressure downstream of the control means and operatively connected thereto in such manner that the fluid flow is adjusted to take account of changes in fluid pressure.

The device may comprise a flexible diaphragm.

The flow control means may be located in a chamber forming part of the first flow path and in which is removably secured a surface which co-operates with the flow control means to control the flow of the one fluid. The surface may be removable from the first housing.

The flow control means may comprise a valve member having a valve surface which co-acts with the removable surface for controlling the flow of the one fluid. The removable surface may be that of a valve seat of annular form and through the annulus may extend a valve stem secured to the valve head which is located on one side of the valve seat and also secured to a permanent magnet located on the other side of the valve seat.

The resilient biassing means may be a helical spring located within the first chamber and positioned between an adjusting member also located within the chamber and the valve head.

By way of example only, embodiments of the present invention will now be described in greater detail with reference to the accompanying drawings of which:

Figure 1:
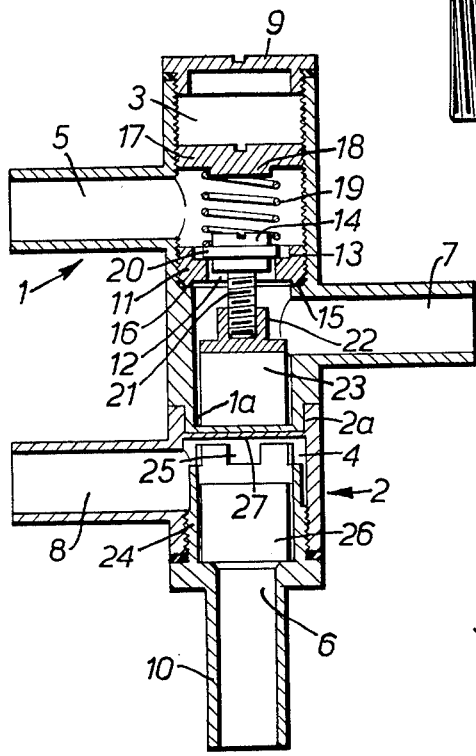
FIG. 1 is a cross-section of a first embodiment.

Referring first to FIG. 1, the embodiment comprises first and second housings 1, 2 which are separate one from the other but adapted to be located in close proximity. This can be achieved in any suitable manner and in the example illustrated, housing 2 has a socket-like recess 2a which mates with the suitably-contoured end 1a of housing 1.

The housings 1, 2 have internal chambers 3, 4 respectively with respective inlets 5, 6 and outlets 7, 8. Housing 1 also has an open end this being closed by a cover cap 9 screw-threaded into the upper (as seen in the drawing) end of the housing 1. Housing 2 is open at its lower (as seen in the drawing) end and into this is screwed an inlet adaptor 10.

The chambers 3, 4 are of generally cylindrical shape. Chamber 3 is internally screw-threaded to receive, in addition to the cover cap 9, a valve seating member 11 with a central bore 12 and stepped internally as at 13 to receive a gas flow control valve 14 to be described in more detail later. The lower (as seen in the drawing) face of the member 11 carries an annular bead 15 which seats on a shoulder 16 formed within the chamber 3 to form a gas-tight seal. Also screwed into chamber 3 is a spring adjuster 17 whose lower (as seen in the drawing) face has a central boss 18 which locates one end of a helical spring 19 extending between the adjuster 17 and the gas valve 14.

The gas flow control valve 14 has a head with a peripheral sealing surface 20 which co-operates with step 13 to control gas flow as will be described later. Depending (as seen in the drawing) from the valve head is a stem 21 to which is screwed an adaptor 22 carrying a magnet 23. The magnet is of cylindrical form and is of anisotropic barium ferrite magnetised axially. The surface of the magnet is covered with a thin layer of polytetrafluorethylene for protection.

The inlet adaptor 10 has a tubular extension 24 located within the chamber 4, the extension terminating just short of the internal wall 27 and being castellated at its end as shown at 25. Positioned within the extension 24 is a closely-fitting second cylindrical magnet 26 also of anisotropic barium ferrite axially magnetised with a thin protective coating of polytetrafluorethylene.

The magnets 23 and 26 are orientated in such manner that like poles are adjacent but in the positions shown in the drawing, spring 19 exerts sufficient force to retain the valve member 14 in its closed position.

In use, gas flow from gas inlet 5 to gas outlet 7 is controlled by valve member 14 in dependence upon the position of magnet 26 itself responsive to water flow from water inlet 6 to water outlet 8. In fact water flows through the housing as soon as the tap is operated and it is the lift created by the differential pressure between the inlet and the outlet that causes the water side magnet to move. The magnet creates a drop in pressure above itself by acting as a restriction. As the upper face of magnet 26 reaches the castellations, water flows through the latter to the outlet 8. As magnet 26 approaches magnet 23, the repulsive force between them increase and as the upper face of magnet 26 reaches the castellations, the loading of spring 19 is overcome and magnet 23 is forced upwardly carrying with it valve member 14 and so lifting surface 20 from step 13 and allowing gas flow from gas inlet 5 to gas outlet 7.

The components are assembled by removing the adaptor 22 and magnet 23 from the stem 21, passing the latter through the seating member 11 and then screwing the latter into the chamber 3 until the annular bead 15 beds in gas-tight manner on to the shoulder 16. The spring 19 is then placed on the valve head 14 and the adjuster screwed into the chamber and into a position in which the adjuster exerts a required force on the valve head. Chamber 3 is then closed by cap 9. Finally, water inlet adaptor 10 is screwed into water inlet 6.

It will be appreciated that seating 11 can be withdrawn from the chamber 3 with the valve head 14 and magnet 23 when necessary for cleaning and/or maintenance.

The housings 1, 2 are constructed of materials selected to meet the properties of the fluids flowing through the housings. In FIG. 1, housing 1 is made from aluminium alloy while housing 2 is glass filled P.P.O.. The housings are completely separate and neither is in contact with the fluid passing through the other.

It will be appreciated that the gas flow path is entirely isolated from the water flow path and thus leakage cannot take place from one path to the other.

Figure 2:
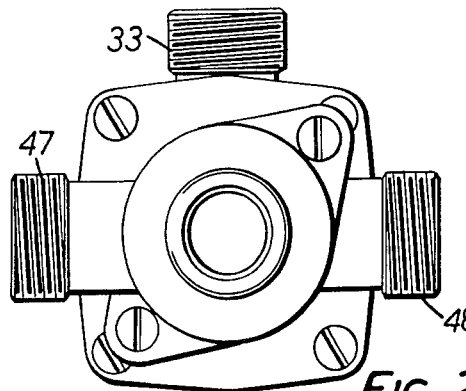
FIG. 2 is an underneath view of a second embodiment.

FIG. 2 shows another embodiment of the invention which is similar in many respects to the embodiment described above and shown in FIG. 1, the principal difference is the incorporation in the embodiment of FIG. 2 of a gas governor.

The embodiment shown in FIG. 2 comprises two housings 30, 31 disposed in close proximity in a manner similar to that of the housings 1, 2 described above.

Housing 30 has an inlet 32 and an outlet 33 and gas flow from one to the other is regulated by a valve member 34 acting in co-operating with a valve seating 35 formed inside the housing 30. The valve member 34 is attached to a rod 36 one end of which passes into an adjuster 37 screw-threaded into an end cap 38 closing one end of the housing 30. The other end of the rod 36 is in contact with a bearing member 39 forming part of an assembly including a locking nut 40 and clamping discs 41, 42 carried by a flexible diaphragm 43. Also forming part of the assembly just mentioned is a permanent magnet 44 located in a part 45 of the housing 30 there being a small bleed hole 46 in the wall of the part 45.

The housing 31 has an inlet 47 in communication with an outlet 48 via an internal chamber 49 in the housing 31. Positioned within the chamber 49 is a component 50 of generally tubular form forming a weir, the lower end of which weir seats on a perforated disc 51.

Figure 3:
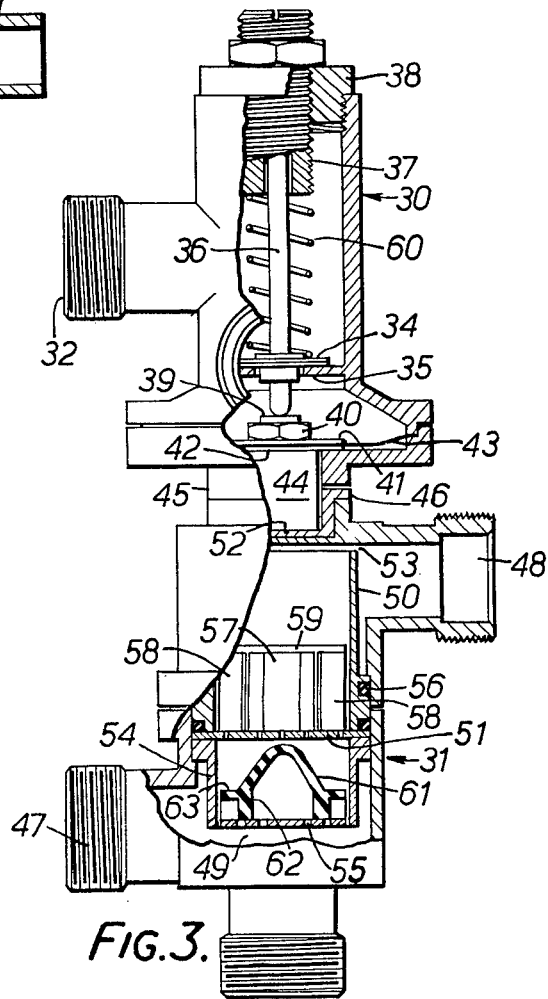
FIG. 3 is an elevation partly in section of the embodiment of FIG. 2.

The upper end (as seen in FIG. 3) of the weir 50 is spaced from the end wall 52 of the housing 31 by a gap 53 which thus provides communication from the interior of the weir 50 to the outlet 48. Also located in the chamber 49 beneath the disc 51 and adjacent inlet 47 is a tubular housing 54 for a water governor to be described later. The housing 54 has an aperture 55 in its end wall.

Movable longitudinally within the weir 50 is a flow responsive member comprising a cylindrical permanent magnet 57 mounted in a holder between a number of legs 58 which extend from an end plate 59 of the holder. The end plate is circular and fits the inside of the weir closely.

The disc 51 acts as a downward limit stop to the magnet/holder assembly.

The housing 31 is composed of two parts and when these are assembled, the 0 rings 56 incorporated in the component 50 effectively seal the two parts to prevent leakage.

The magnets 44 and 57 are of any suitable magnetic material, for example barium ferrite, are axially magnetised and are arranged with like poles adjacent so that a force of repulsion exists between the magnets under certain conditions to be explained later.

The water governor has a thin-walled domed portion 61 of substantially hemi-spherical form integral with an annular portion 62 generally more rigid than the domed portion. At the circumferential junction between portions 61 and 62 is formed a series of castellations 63 that extend almost to the wall of the housing 54.

In use, the control is fitted with inlet 32 connected to gas supply pipe (not shown) while outlet 33 is joined to a gas inlet on the heater (not shown). Inlet 47 is joined to a water supply pipe (not shown) while outlet 48 is connected to a water inlet of the heater. In the condition of no water flow from inlet 47 to outlet 48 the movable parts are in the positions shown in FIG. 3. Valve member 34 is urged on to seating 35 by a helical spring 60 thereby preventing gas flow from inlet 32 to outlet 33.

When in the positions shown in FIG. 3, the magnets 44 and 57 are sufficiently spaced apart to prevent any magnetic interaction between them. As water flow through chamber 49 commences and then increases, the flow responsive member is lifted from the position shown in FIG. 3 in which the member rests on the discs 51 and is moved along the weir towards the wall 52. The magnetic interaction between the magnets 44 and 57 increases but initially is insufficient to overcome the loading of magnet 44 by spring 60. However, as the end plate 59 of the flow responsive member just clears the upper end (as seen in FIG. 3) of the weir 50 the interaction between the magnets 44 and 57 is sufficient to overcome the loading and to cause magnet 44 to move upwardly and away from magnet 57. That movement lifts the valve member 34 from the seating 35 and gas flows from inlet 32 to outlet 33. In addition, upward movement of the flow responsive member and thus of magnet 57 ceases and the latter two components are maintained in position by the flow of water through the weir and gap 53. It will be appreciated that movement of the magnet 44 and valve member 34 occurs against the action of spring 60, the latter having been adjusted by means of adjuster 37 so that at a predetermined gas pressure in inlet 32 a requisite gas flow is obtained. Any variation in gas pressure from the predetermined value causes the diaphragm to move in a direction which produces a compensatory movement of the valve member 34 towards or away from the seating 35 and this maintains the requisite gas flow. Movement of the diaphragm is "damped" by the magnetic force existing between the magnets 44 and 57 and "hunting" movement of the diaphragm does not occur. The bleed passage 46 is of such size that pneumatic damping of the diaphragm movement does not take place and that, should the diaphragm rupture, escape of gas through the rupture and the bleed passage 46 is kept to an acceptable limit.

When water flow through chamber 49 ceases, the flow responsive member returns to the position shown in FIG. 3. The magnetic force between the magnets becomes ineffective to maintain the valve member 34 clear of the seat 35 and the valve member 34 is urged on to the seat 35 by the spring 60 and the flow of gas also ceases.

The water governor also responds to water flow from inlet 47 to outlet 48. The spacings between adjacent castellations 63 are selected so that a required flow of water is obtained at a specified head of water. At that head the governor is seated upon the end wall of the housing 54. An increase in water pressure above the specified head just mentioned lifts the governor and the top of the domed portion 61 approaches the disc 51. Depending upon the pressure, the domed portion 61 may be pressed against the disc 51 and will be flattened thereby preventing water flow through the central apertures in the disc 51, so maintaining the rate of flow of water through the disc 51 at the required value despite the increase in pressure.

The skirt portion 62 in conjunction with the castellations 63 provide guidance for the governor as it moves axially in response to changes in water pressure.

It will be appreciated that the water pressure at which the governing action just described come into operation will depend, inter alia, upon the stiffness of the domed portion 61 and upon the shape of the latter. It is not essential to use the semi-spherical shape described above and other shapes, for example frusto-conical, may be used.

It will also be understood that provided the disc 61 is permeable to water, the disc does not have to be perforated.

Although the invention has been described in its application to gas flow under the control of water flow, it can be embodied in apparatus for controlling other fluids than gas in response to fluid flows other than water.

It will also be understood that by a suitable rearrangement of the parts, magnets operating in an attractive mode instead of a repulsive mode can be employed.

I claim:

1. Apparatus for controlling the flow of one fluid in dependence upon the flow of another fluid comprising
   1. a first housing of non-magnetic material having a flow path therethrough for the one fluid,
   2. a second housing of non-magnetic material having a flow path therethrough for the second fluid, in non-communicating relationship with the first mentioned flow path,
   3. fluid flow control means in the flow path in the first housing for controlling fluid flow along that path,
   4. flow responsive means in the flow path in the second housing movable therein in response to flow along that path,
   5. first and second permanent magnet means forming part of the flow control means and the flow responsive means respectively,
   6. weir means in the flow path through the second housing and in which said flow responsive means is located, said weir means acting to ensure a predetermined movement of said flow responsive means, and,
   7. said housing being in close proximity whereby said predetermined movement of said flow responsive means operates said fluid flow control means.

2. Apparatus as claimed in claim 1 and further comprising
   8. resilient means for biassing the flow control means against operation to permit flow of the one fluid.

3. Apparatus as claimed in claim 1 in which the weir is removably mounted in the flow path through the second housing.

4. Apparatus as claimed in claim 1 and further comprising
   9. a fluid flow governor device associated with the flow control means.

5. Apparatus as claimed in claim 4 in which the device is exposed, in use, to fluid pressure downstream of the flow control means and operatively connected to the latter in such manner that fluid flow through the first housing is adjusted to take account of changes in fluid pressure.

6. Apparatus as claimed in claim 5 in which the device comprises a flexible diaphragm.

7. Apparatus as claimed in claim 1 in which the flow control means is located in a chamber which forms part of the first flow path and in which is removably secured a surface which cooperates with the flow control means to control the flow of the one fluid.

8. Apparatus as claimed in claim 7 in which the flow control means comprises a valve member having a valve surface that co-acts with the removable surface to control flow of the one fluid.

9. Apparatus as claimed in claim 8 in which the removable surface is of annular form and extending through the annulus is a valve stem secured to the valve member located on one side of the surface, the valve stem also being secured to the permanent magnet that is located on the other side of the surface.

10. Apparatus as claimed in claim 1 and further comprising
    10. a fluid flow governor located in the fluid flow path in the second housing.

11. Apparatus as claimed in claim 10 in which the fluid flow governor is located in a chamber having an outlet in which is located a component pervious, at least over part of its surface area, to fluid flow through the second housing, the fluid flow governor having a portion of a flexible material impervious to the fluid, the arrangemennt being such that, in use, an increase in fluid pressure above a predetermined value brings the flexible portion into contact with the pervious part over an area determined by the increase in fluid pressure.

12. Apparatus as claimed in claim 11 in which the portion is of domed form and is secured to a further portion of annular form, a series of castellations being formed at the circumferential junction between the two portions.

13. Apparatus as claimed in claim 11 in which the component is of a material impervious to water flow and has apertures to permit passage of the fluid through the component.

14. Apparatus as claimed in claim 1 in which the first and second housings are of different materials, the material for each housing being selected to meet the requirements of the fluid flowing through the housing.

* * * * *